United States Patent
Khan et al.

(10) Patent No.: US 10,747,562 B2
(45) Date of Patent: Aug. 18, 2020

(54) NESTED HYPERVISOR TO RUN VIRTUAL MACHINES ON PUBLIC CLOUDS

(71) Applicant: VMWARE, INC., Palo Alto, CA (US)

(72) Inventors: Irfan Ulla Khan, Bengaluru (IN); Halesh Sadashiv, Bengaluru (IN); Jayalekshmy Nair, Bengaluru (IN); Keerthi B Kumar, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 166 days.

(21) Appl. No.: 15/641,349

(22) Filed: Jul. 5, 2017

(65) Prior Publication Data
US 2018/0314541 A1 Nov. 1, 2018

(30) Foreign Application Priority Data
Apr. 26, 2017 (IN) .............................. 201741014809

(51) Int. Cl.
*G06F 9/455* (2018.01)
(52) U.S. Cl.
CPC ...... *G06F 9/45545* (2013.01); *G06F 9/45558* (2013.01); *G06F 2009/4557* (2013.01); *G06F 2009/45566* (2013.01); *G06F 2009/45579* (2013.01); *G06F 2009/45583* (2013.01); *G06F 2009/45595* (2013.01)
(58) Field of Classification Search
CPC ....... G06F 9/45558; G06F 2009/45566; G06F 2009/4557; G06F 2009/45579; G06F 2009/45583; G06F 2009/45595; G06F 9/45545
See application file for complete search history.

(56) References Cited

U.S. PATENT DOCUMENTS

| 10,108,446 B1* | 10/2018 | Steinberg | G06F 9/45558 |
| 2011/0072428 A1* | 3/2011 | Day, II | G06F 9/45558 718/1 |
| 2012/0131574 A1* | 5/2012 | Day, II | G06F 9/45558 718/1 |
| 2012/0260247 A1* | 10/2012 | Huang | G06F 9/45541 718/1 |
| 2014/0281118 A1* | 9/2014 | Hepkin | G06F 9/45533 711/6 |
| 2014/0282539 A1* | 9/2014 | Sonnek | G06F 9/45558 718/1 |
| 2015/0370594 A1* | 12/2015 | Ghosh | G06F 9/45533 718/1 |
| 2017/0192801 A1* | 7/2017 | Barlev | G06F 9/4555 |

* cited by examiner

*Primary Examiner* — Jacob D Dascomb
(74) *Attorney, Agent, or Firm* — Patterson + Sheridan, LLP

(57) ABSTRACT

An example method of provisioning a virtual machine in a cloud system includes: receiving a request to provision the virtual machine in the cloud system; provisioning a first virtual machine managed by a hypervisor executing on a host computer in the cloud system, the hypervisor allocating resources to the first virtual machine; provisioning a nested hypervisor in the first virtual machine; and provisioning the virtual machine to execute on the nested hypervisor without re-virtualizing the resources allocated by the hypervisor to the nested hypervisor.

17 Claims, 4 Drawing Sheets

NESTED HYPERVISOR TO RUN VIRTUAL MACHINES ON PUBLIC CLOUDS

RELATED APPLICATION

Benefit is claimed under 35 U.S.C. 119(a)-(d) to Foreign Application Serial No. 201741014809 filed in India entitled "NESTED HYPERVISOR TO RUN VIRTUAL MACHINES ON PUBLIC CLOUDS", on Apr. 26, 2017, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

As hybrid cloud systems play an increasingly more prominent role in digital transformation, customers want the ability to run their virtual machines associated with the cloud provider on both private and public clouds, while being agnostic of the underlying hardware or hypervisor. Customers want the ability to be able to seamlessly migrate VMs between public and private cloud.

SUMMARY

One or more embodiments provide techniques for provisioning a virtual machine in a cloud environment. In an embodiment, a method of provisioning a virtual machine in a cloud system includes: receiving a request to provision the virtual machine in the cloud system; provisioning a first virtual machine managed by a hypervisor executing on a host computer in the cloud system, the hypervisor allocating resources to the first virtual machine; provisioning a nested hypervisor in the first virtual machine; and provisioning the virtual machine to execute on the nested hypervisor without re-virtualizing the resources allocated by the hypervisor to the nested hypervisor.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
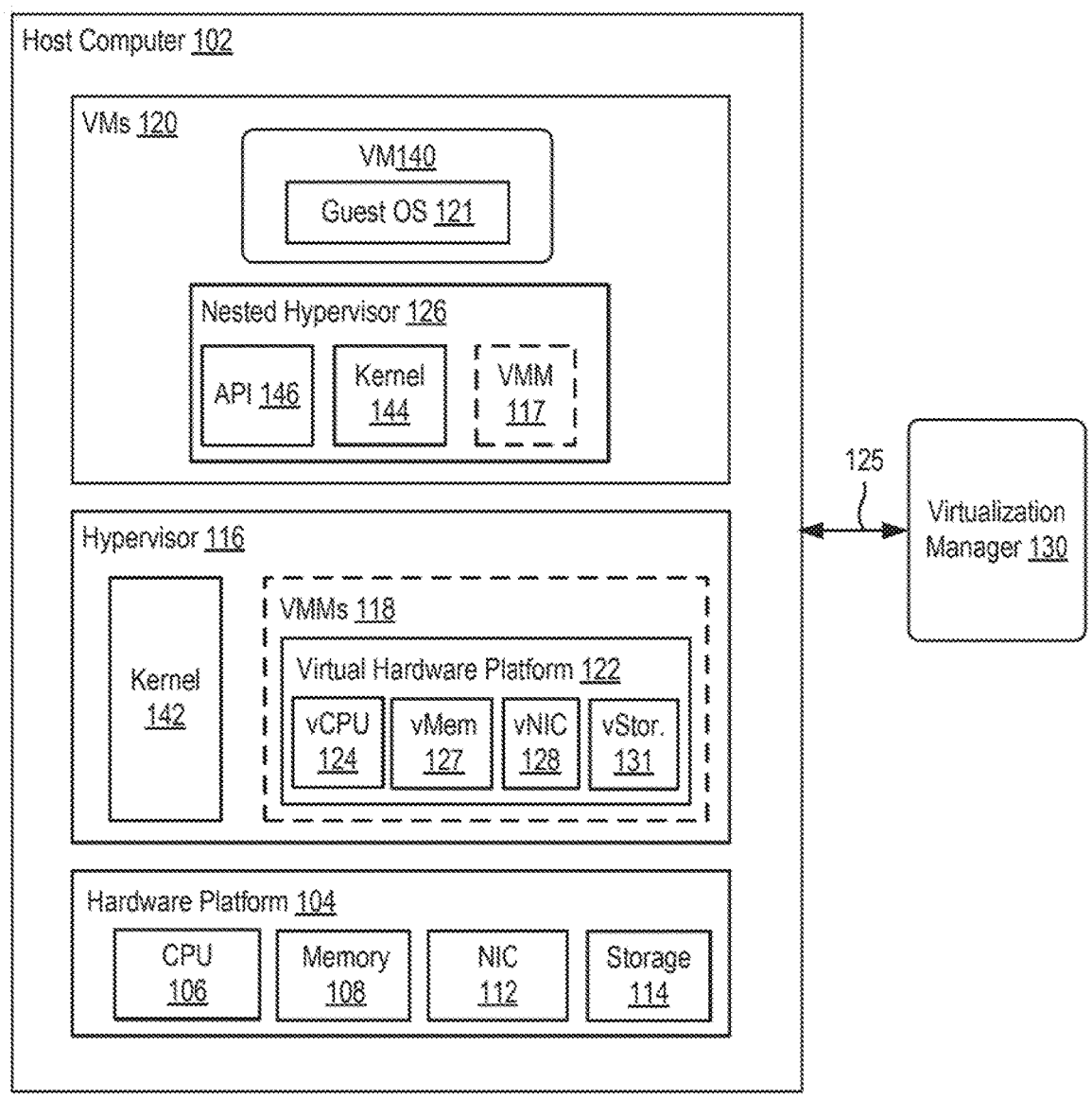
FIG. 1 is a block diagram of a virtualized computing system 100, according to one embodiment disclosed herein.

FIG. 1 is a block diagram of a virtualized computing system 100, in which one or more embodiments of the present disclosure may be practiced. Virtualized computing system 100 may include one or more host computer systems 102. Host computer system 102 may be disposed in, for example, a private data center or a cloud data center. A private data center may be a data center controlled and administrated by a particular enterprise or business organization, while a cloud data center may be operated by a cloud computing service provider and exposed as a service available to account holders, such as the particular enterprise in addition to other enterprises. As such, a private data center may sometimes be referred to as a "private" cloud, and a cloud data center may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Host computer system 102 may be constructed on a server grade hardware platform 104, such as an x86 architecture platform. As shown, hardware platform 104 may include conventional components of a computing device, such as one or more processors (CPUs) 106, system memory (memory) 108, a network interface (NIC) 112, storage system (storage) 114, and other I/O devices such as, for example, a mouse and keyboard (not shown). CPU 106 is configured to execute instructions, for example, executable instructions that perform one or more operations described herein and may be stored in memory 108 and in local storage. Memory 108 is a device allowing information, such as executable instructions, cryptographic keys, virtual disks, configurations, and other data, to be stored and retrieved. Memory 108 may include, for example, one or more random access memory (RAM) modules. Network interface 112 enables the host computer system 102 to communicate with another device via a communication medium, such as a network within virtualized computing system 100. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host computer system 102 to communicate with one or more network data storage systems. Examples of a storage interface are a host bus adapter (HBA) that couples host computer system 102 to one or more storage arrays, such as a storage area network (SAN) or a network-attached storage (NAS), as well as other network data storage systems.

Host computer system 102 is configured to provide a virtualization layer that abstracts processor, memory, storage, and networking resources of hardware platform 104 into multiple virtual machines 120 (collectively referred to as VMs 120) that run concurrently on host computer system 102. VMs 120 run on top of a software interface layer, referred to herein as a hypervisor 116, that enables sharing of the hardware resources of host computer system 102 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 executes directly on hardware components of host computer system 102 (although it should be recognized that any other virtualization technologies, including Xen®, Microsoft Hyper-V®, KVM, the like, may be utilized consistent with the teachings herein).

Virtualized computing system 100 includes a virtualization management component (depicted in FIG. 1 as a virtualization manager 130) that may communicate with host computer system 102 via a network 125, sometimes referred to as a management network 125. In one embodiment, virtualization manager 130 is a computer program that resides and executes in a central server, which may reside in virtualized computing system 100, or alternatively, run as a VM in host computer system 102. One example of a virtualization manager is the vCenter Server™ product made available from VMware, Inc. Virtualization manager 130 is configured to carry out administrative tasks for virtualized computing system 100, including managing host computer system 102, managing VMs 120 running within host computer system 102, provisioning VMs, migrating VMs from host computer system 102 to another host, and load balancing between one or more host computer systems 102.

Hypervisor 116 includes a kernel 142 and virtual machine managers (VMMs) 118. For each VM 120, hypervisor 116 includes a VMM 118 that manages a corresponding virtual hardware platform 122. A virtual hardware platform 122 includes emulated hardware, such as a virtualized CPU 124 (vCPU), a virtualized memory 127 (vMem), a virtualized NIC 128 (vNIC), and one or more virtualized storage devices 131 (vStor.). For example, virtual hardware platform 122 may function as an equivalent of an x86 hardware platform. In general, virtualized CPU 124 can include one or more processors that are backed by processors of CPU 106. Virtualized memory 127 includes a logical memory, which is referred to herein as hypervisor physical memory, backed by memory 108, which is referred to herein as machine memory. Hypervisor physical memory includes a flat logical address space divided into hypervisor physical pages (HPPs) that are mapped to machine pages (MPs) in the address space of memory 108. Kernel 142 and/or VMM 118 maintain page tables or other data structures that map HPPs to MPs. For example, for x86 hardware, kernel 142 and/or VMM 118 can maintain nested page tables (NPTs) that map HPPs to MPs. Hypervisor 116 exposes the NPTs to CPU 106.

Any of the VMs 120 may execute a nested hypervisor 126. Nested hypervisor 126 functions similarly to hypervisor 116, but provides a reduced virtualization footprint. For example, just as hypervisor 116 runs on top of hardware platform 104 to execute VMs 120, nested hypervisor 126 runs on top of virtual hardware platform 122. One difference, however, is that nested hypervisor 126 is configured to execute only a single VM 140 (e.g., some functionality configured to manage multiple VMs is removed or disabled in nested hypervisor 126). Nested hypervisor 126 includes a kernel (referred to as a kernel 144), a VMM 117, and one or more user applications that provide, among other functions, an application programming interface (API) 146 for nested hypervisor 126. VMM 117 dedicates a portion of virtual hardware platform 122 to VM 140 (while reserving a portion for use by kernel 144). VM 140 may execute a guest operating system 121, as well as one or more applications (not shown) on top of guest operating system 121. In an embodiment, nested hypervisor 126 and hypervisor 116 are heterogeneous. For example, nested hypervisor 126 can be a micro-version of ESXi and hypervisor 116 can be a full version of ESXi, a version of KVM, or the like.

The kernel 144 and VMM 117 do not re-virtualize the virtualized hardware (i.e., resources) provided by hypervisor 116. In an embodiment, nested hypervisor 126 dedicates one or more processors of virtualized CPU 124 for the sole use by VM 140 (nested hypervisor 126 "pins" processor(s) of virtualized CPU 124 to VM 140). In this manner, kernel 144 does not enable or include a scheduler for virtualizing CPU resources among multiple VMs. In an embodiment, nested hypervisor 126 dedicates a portion of virtualized memory 127 to VM 140. Nested hypervisor 126 provides a logical memory to VM 140, referred to herein as guest physical memory, which is directly mapped to the hypervisor physical memory of virtualized memory 127. Kernel 144 and/or VMM 117 maintains page tables or other data structures that pin guest physical pages (GPPs) to HPPs (e.g., guest physical page numbers=hypervisor physical page numbers). In this manner, kernel 144 does not enable or include a scheduler for virtualizing memory resources among multiple VMs. In an embodiment, nested hypervisor 126 dedicates one or more input/output (IO) devices (e.g., NICs, storage devices, etc.) for the sole use by VM 140. VM 140 accesses such devices directly without intervention by nested hypervisor 126 using, for example, direct memory access (DMA). In this manner, kernel 144 does not enable or include a scheduler for virtualizing 10 devices. By removing or disabling schedulers of processor, memory, and/or device resources, kernel 144 provides a reduced virtualization footprint as compared to a full version of a hypervisor (e.g., hypervisor 116). This allows for increased performance of nested hypervisor 126 than would be possible if nested hypervisor 126 were a full-featured hypervisor.

Figure 2:
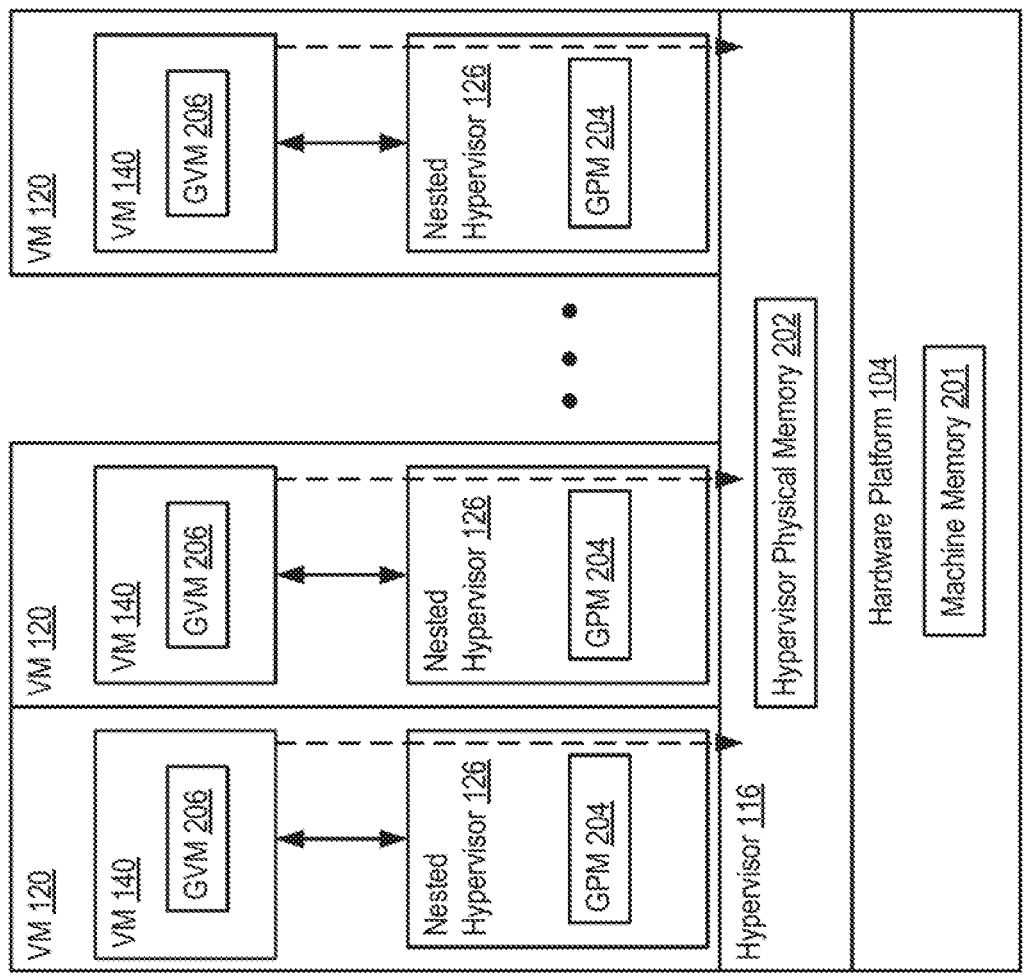
FIG. 2 is a logical diagram of the virtual computing system 100 of FIG. 1, according to one embodiment.

FIG. 2 is a logical diagram of virtualized computing system 100 of FIG. 1, according to one embodiment. Elements in FIG. 2 that are the same or similar to those of FIG. 1 are designated with identical reference numerals. FIG. 2 illustrates hardware platform 104, hypervisor 116, and VM 120 in a stacked configuration. As shown, VM 120 executes nested hypervisor 126. Nested hypervisor 126 is optimized to run only a single VM 140, as discussed above.

As discussed above, hypervisor 116 virtualizes machine memory 201 in hardware platform 104 to provide hypervisor physical memory 202. Hypervisor 116 allocates some hypervisor physical memory 202 to each VM 120. Nested hypervisor 126 presents guest physical memory (GPM) 204 to VM 140. Guest physical memory 204 is backed by host physical memory 202. Nested hypervisor 126 reserves some host physical memory 202 for itself, and pins the remaining host physical memory 202 to VM 140 as guest physical memory 204. That is, nested hypervisor 126 does not virtualize host physical memory 202 for VM 140. A guest operating system of VM 140 virtualizes guest physical memory 204 to provide guest virtual memory (GVM) 206. The guest operating system of VM 140 exposes page tables to CPU 106 that map guest virtual memory to guest physical memory (which has a one-to-one correspondence with host physical memory 202 allocated to nested hypervisor 126).

In some techniques, when nested hypervisors are executed within a VM, the nested hypervisor re-virtualize the memory resources allocated thereto, thus creating an additional memory virtualization layer. In embodiments described herein, nested hypervisor 126 does not re-virtualize the memory resources allocated by hypervisor 116.

In the present application, nested hypervisor 126 is configured to provision only a single VM 140. Because nested hypervisor 126 provisions only a single VM 140, the resources allocated to VM 120 in which nested hypervisor 126 is executing are not re-virtualized when allocated to VM 140. As such, host physical memory 202 is effectively pushed from hypervisor 116 to VM 140. Further, the operating system overhead of nested hypervisor 126 having to schedule resources (e.g., CPU, memory, I/O) is eliminated. As such, when nested hypervisor 126 is executing in VM 120, one or more vCPUs 124 and one or more IO devices (e.g., vNIC 128) are pinned to VM 140.

Generally, as illustrated in FIG. 2, there is a one-to-one correspondence between a number of VMs 140 desired and a number of nested hypervisors 126. For each VM 140, there is a corresponding VM 120 executing a nested hypervisor 126 therein. For example, as illustrated, virtualized computing system 100 includes one VM 140 per VM 120. The effect is that resource scheduling performed by hypervisor 116 passes through to VMs 140. This allows a user access to an API of the nested hypervisor 126 for managing VM 140, without incurring a decrease in performance due to the nesting of hypervisors.

Figure 3:
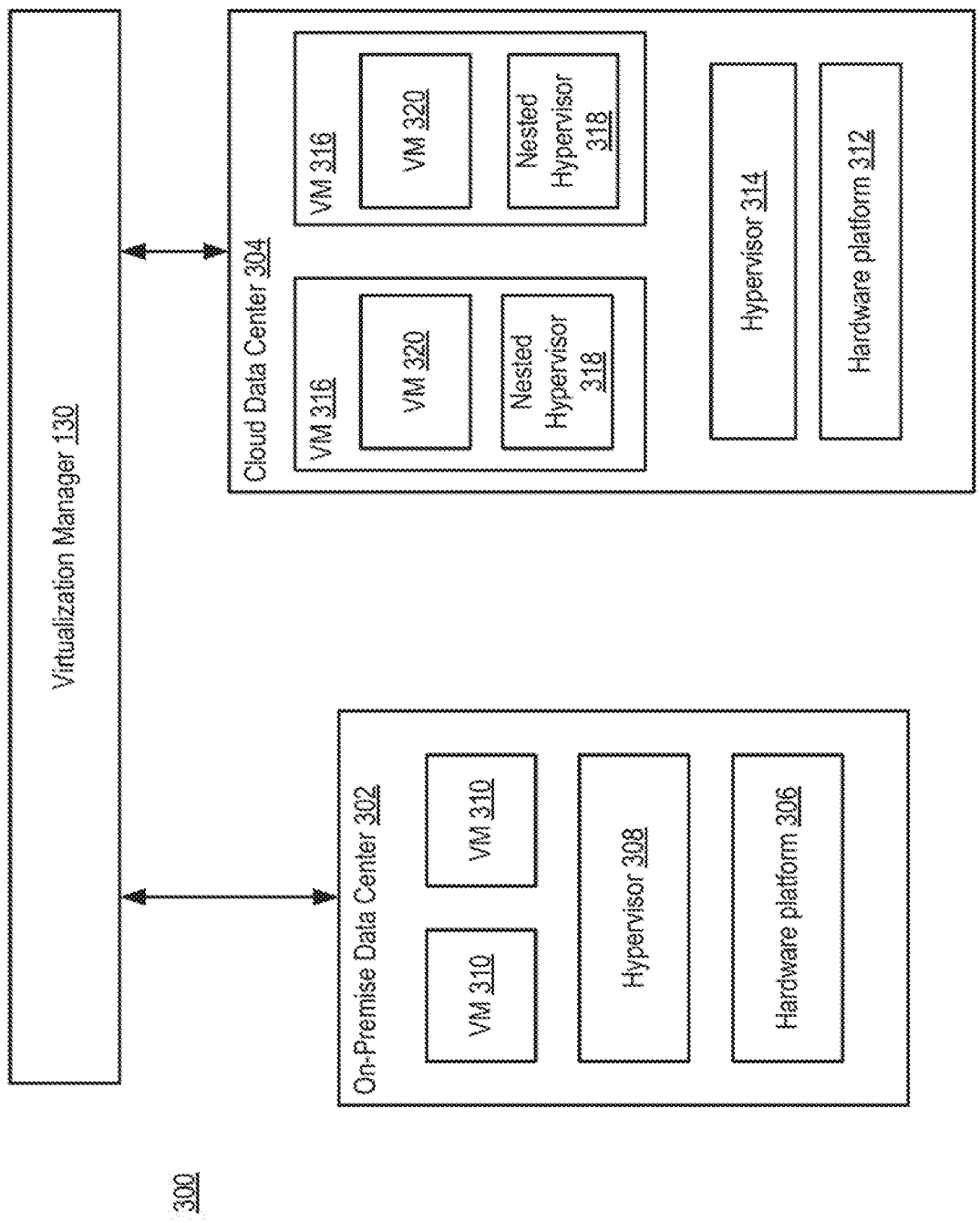
FIG. 3 is a logical diagram of a hybrid cloud system using the virtual computing system of claim 1 as an on-premise data center and as a cloud data center, according to one embodiment.

FIG. 3 is a logical diagram of a hybrid cloud system 300 using instances of virtualized computing system 100 as an on-premise data center 302 and as a cloud data center 304, according to one embodiment. On-premise data center 302 includes hardware platform 306 (similar to hardware platform 104), hypervisor 308, and one or more VMs 310 managed by hypervisor 308. In this example, the hypervisor 308 from on-premise data center is of a first type. For example, hypervisor 308 may be a full-version of ESXi. The customer manages VMs 310 through an API of hypervisor 308 (e.g., using virtualization manager 130).

Cloud data center 304 is accessed by a customer. Cloud data center 304 includes hardware platform 312 (similar to hardware platform 104), hypervisor 314, and one or more VMs 316 managed by hypervisor 314. Hypervisor 314 can be different from hypervisor 308. For example, hypervisor 314 can be a KVM-based hypervisor. In some cases, the customer may not even know the brand or type of hypervisor 314. In this example, the customer desires to run one or more VMs in cloud data center 304, while still utilizing an API of ESXi to manage the VMs. As such, to carry out the request, a nested hypervisor 318 is provisioned in each VM 316. Nested hypervisor 318 is of a type associated desired by the customer (e.g., ESXi). However, as noted above, nested hypervisor 318 is a reduced-functionality version of the desired type of hypervisor (e.g., ESXi with a MicroESXi kernel. Once the nested hypervisor 318 is provisioned and executing in VM 316, hypervisor 318 provisions a single VM 320, in accordance with workload request. If the workload request requires more than one VM 320, then hypervisor 314 would run more than one VM 316, with each VM 316 having nested hypervisor 318 executing therein, and each hypervisor 318 provisioning a single VM 320. The customer can then manage VMs 320 using the desired API despite cloud data center 304 using a hypervisor 314 of a different or unknown type. Further, nested hypervisor 318 does not exhibit decreased performance traditionally associated with nesting of hypervisors, as discussed above.

Figure 4:
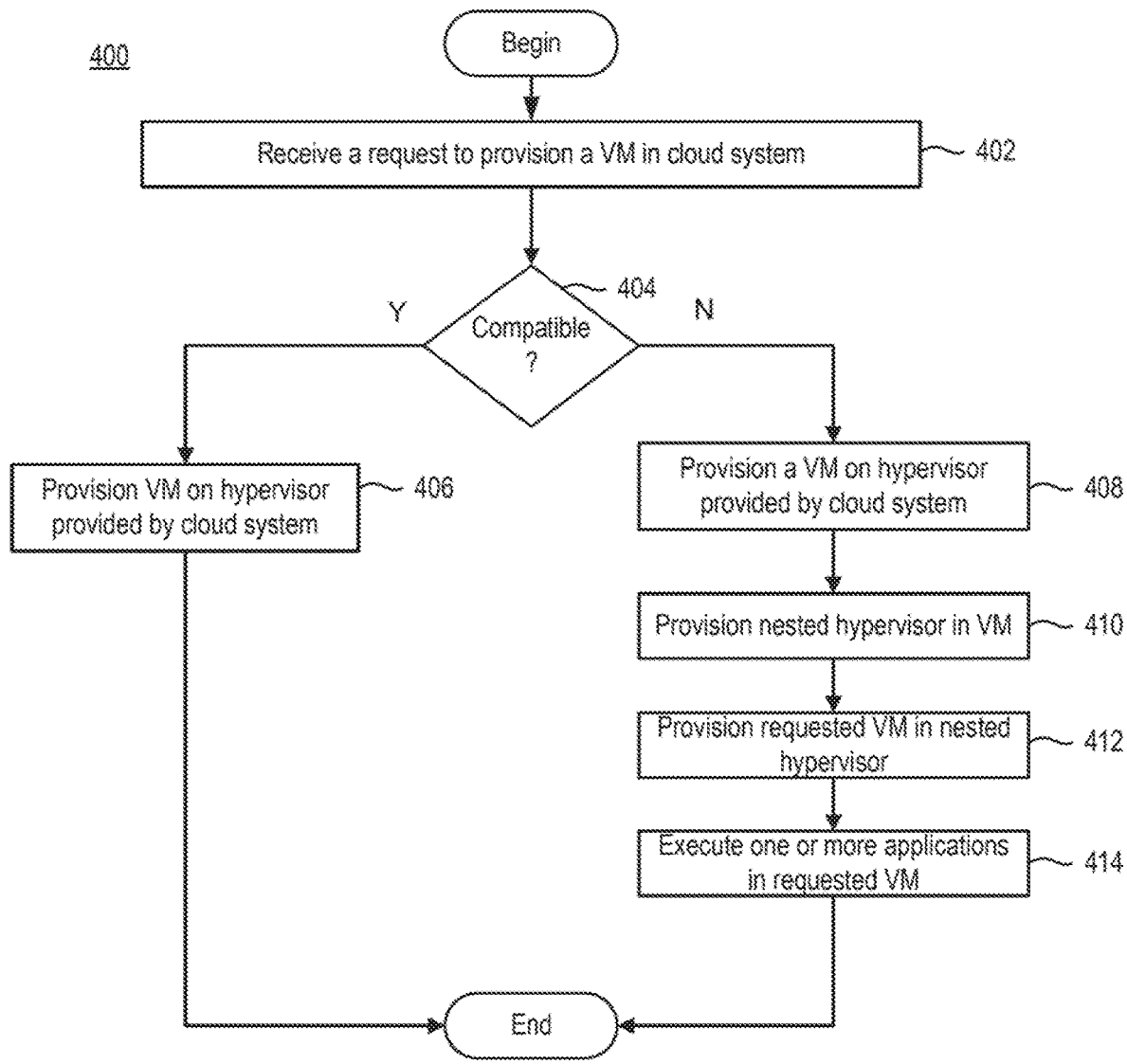
FIG. 4 is a flowchart illustrating a method of provisioning a virtual machine on a cloud environment, according to one embodiment disclosed herein.

FIG. 4 is a flowchart illustrating a method 400 of provisioning a virtual machine on a cloud system, according to one embodiment disclosed herein. At step 402, virtualization manager 130 receives a request to provision a VM in the cloud system. For example, the request may include instructions to provision a VM to run an application thereon.

At step 404, virtualization manager 130 determines if the cloud provider employs a compatible hypervisor for the requested VM. For example, the requested VM may be for an ESXi hypervisor, and the cloud system may also employ ESXi hypervisors or the cloud system may employ different or unknown hypervisors. If virtualization manager 130 determines that the cloud system includes a hypervisor compatible with the requested VM, then at step 406, virtualization manager 130 provisions the VM on the hypervisor provided by the cloud system.

If, however, virtualization manager 130 determines that the cloud system provides an incompatible hypervisor, at step 408, virtualization manager 130 requests provisioning of a VM on a hypervisor provided by the cloud system. For example, referring to FIGS. 1-2, cloud system can use a hypervisor 116 to provisions a VM 120.

At step 410, in the VM provisioned by the cloud system, virtualization manager 130 provisions a nested hypervisor. The nested hypervisor is compatible with the requested VM and can be a reduced-functionality version of the compatible hypervisor, as discussed above. For example, referring to FIGS. 1-2, virtualization manager 130 provisions nested hypervisor 126 in a VM 120.

At step 412, virtualization manager 130 provisions the requested VM in the nested hypervisor. The nested hypervisor does not re-virtualize the resources allocated by the outer hypervisor, as discussed above. For example, nested hypervisor 126 provisions a single VM 140 without re-virtualizing components of virtual hardware platform 122. Virtualization manager 130 can now execute and manage the VM using the expected and known API of the nested hypervisor. Optionally, at step 414, virtualization manager 130 may execute one or more applications on the requested VM.

Accordingly, because both on-premise and cloud environments provision VMs 140 of the same type, a user can seamlessly migrate the VMs 140 to each environment without any need to reconfigure the VMs 140 to be compatible with the underlying hypervisor of each environment.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including band-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of provisioning a virtual machine in a cloud system, comprising:
receiving a request to provision the virtual machine in the cloud system;
provisioning a first virtual machine managed by a hypervisor executing on a host computer in the cloud system, the hypervisor allocating resources to the first virtual machine, the resources including a plurality of processors;
provisioning a nested hypervisor in the first virtual machine; and
provisioning the virtual machine to execute on the nested hypervisor without re-virtualizing the resources allocated by the hypervisor to the nested hypervisor, wherein the nested hypervisor dedicates at least one of the plurality of processors to the virtual machine.

2. The method of claim 1, wherein the virtual machine is an only virtual machine executing on the nested hypervisor.

3. The method of claim 1, wherein the resources allocated by the hypervisor to the first virtual machine include memory pages, and wherein the nested hypervisor dedicates the memory pages to the virtual machine.

4. The method of claim 1, wherein the resources allocated by the hypervisor to the first virtual machine include input/output (TO) devices, and wherein the nested hypervisor dedicates the IO devices to the virtual machine.

5. The method of claim 1, wherein the nested hypervisor does not enable or include a scheduling function to schedule the resources among multiple virtual machines.

6. The method of claim 1, wherein the hypervisor and the nested hypervisor include different management application programming interfaces (APIs).

7. The method of claim 1, wherein the cloud system is a public portion of a hybrid cloud system, and wherein the request is received from a data center of a private portion of the hybrid cloud system.

8. A non-transitory computer readable medium having instructions stored thereon that when executed by a processor cause the processor to perform a method of provisioning a virtual machine in a cloud system, comprising:
  receiving a request to provision the virtual machine in the cloud system;
  provisioning a first virtual machine managed by a hypervisor executing on a host computer in the cloud system, the hypervisor allocating resources to the first virtual machine, the resources including a plurality of processors;
  provisioning a nested hypervisor in the first virtual machine; and
  provisioning the virtual machine to execute on the nested hypervisor without re-virtualizing the resources allocated by the hypervisor to the nested hypervisor, wherein the nested hypervisor dedicates at least one of the plurality of processors to the virtual machine.

9. The non-transitory computer readable medium of claim 8, wherein the virtual machine is an only virtual machine executing on the nested hypervisor.

10. The non-transitory computer readable medium of claim 8, wherein the resources allocated by the hypervisor to the first virtual machine include memory pages, and wherein the nested hypervisor dedicates the memory pages to the virtual machine.

11. The non-transitory computer readable medium of claim 8, wherein the resources allocated by the hypervisor to the first virtual machine include input/output (TO) devices, and wherein the nested hypervisor dedicates the IO devices to the virtual machine.

12. The non-transitory computer readable medium of claim 8, wherein the nested hypervisor does not enable or include a scheduling function to schedule the resources among multiple virtual machines.

13. The non-transitory computer readable medium of claim 8, wherein the hypervisor and the nested hypervisor include different management application programming interfaces (APIs).

14. The non-transitory computer readable medium of claim 8, wherein the cloud system is a public portion of a hybrid cloud system, and wherein the request is received from a data center of a private portion of the hybrid cloud system.

15. A computer system, comprising:
  a hardware platform having a central processing unit (CPU) and memory; and
  a software platform having code stored in the memory that is executable by the CPU to:
    receive a request to provision a virtual machine in a cloud system;
    provision a first virtual machine managed by a hypervisor executing on a host computer in the cloud system, the hypervisor allocating resources to the first virtual machine, the resources including a plurality of processors;
    provision a nested hypervisor in the first virtual machine; and
    provision the virtual machine to execute on the nested hypervisor without re-virtualizing the resources allocated by the hypervisor to the nested hypervisor, wherein the nested hypervisor dedicates at least one of the plurality of processors to the virtual machine.

16. The computer system of claim 15, wherein the virtual machine is an only virtual machine executing on the nested hypervisor.

17. The computer system of claim 15, wherein the resources allocated by the hypervisor to the first virtual machine include memory pages, and wherein the nested hypervisor dedicates the memory pages to the virtual machine.

\* \* \* \* \*

UNITED STATES PATENT AND TRADEMARK OFFICE
CERTIFICATE OF CORRECTION

PATENT NO. : 10,747,562 B2
APPLICATION NO. : 15/641349
DATED : August 18, 2020
INVENTOR(S) : Irfan Ulla Khan et al.

Page 1 of 1

It is certified that error appears in the above-identified patent and that said Letters Patent is hereby corrected as shown below:

In the Claims

Column 8, Line 66, "(TO)" should read --(IO)--.
Column 9, Line 40, "(TO)" should read --(IO)--.

Signed and Sealed this
Fifteenth Day of December, 2020

Andrei Iancu
*Director of the United States Patent and Trademark Office*